United States Patent
Jiang (10) Patent No.: US 11,711,881 B2
(45) Date of Patent: Jul. 25, 2023

(54) METHOD OF QUICKLY SETTING DMX ADDRESS OF LIGHT FIXTURE

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd.

(*) Notice: Subject to any disclaimer, the term of this patent is extended or adjusted under 35 U.S.C. 154(b) by 262 days.

(21) Appl. No.: 17/219,152

(22) Filed: Mar. 31, 2021

(65) Prior Publication Data

US 2021/0219405 A1   Jul. 15, 2021

Related U.S. Application Data

(63) Continuation of application No. PCT/CN2020/072096, filed on Jan. 14, 2020.

(30) Foreign Application Priority Data

Apr. 29, 2019 (CN) .......................... 201910355562.0

(51) Int. Cl.
    *H05B 47/10* (2020.01)
    *H05B 47/18* (2020.01)
(52) U.S. Cl.
    CPC .................... *H05B 47/18* (2020.01)
(58) Field of Classification Search
    CPC .... H05B 47/10; H05B 47/105; H05B 47/175; H05B 47/18
    See application file for complete search history.

(56) References Cited

U.S. PATENT DOCUMENTS

2013/0001405 A1* 1/2013 Walker .................. G01J 1/0411
250/208.2

FOREIGN PATENT DOCUMENTS

| CN | 101031173 A | 9/2007 |
| CN | 101699923 A | 4/2010 |
| CN | 104853503 A | 8/2015 |
| CN | 105282904 A | 1/2016 |
| CN | 107529263 A | 12/2017 |

(Continued)

OTHER PUBLICATIONS

International Search Report for PCT/CN2020/072096 dated Apr. 2, 2020; 2 pages.

(Continued)

*Primary Examiner* — Jimmy T Vu
(74) *Attorney, Agent, or Firm* — Lerner David LLP (57) ABSTRACT

A method of quickly setting a DMX address of a light fixture, the controller sending a DMX address to an i-th light fixture through a first signal line; the i-th light fixture setting DMX address as the received DMX address, calculating a DMX address of an (i+1)th light fixture based on the received DMX address, and sending the DMX address of the (i+1)th light fixture to the (i+1)th light fixture through the first signal line; the (i+1)th light fixture setting DMX address thereof as the received DMX address, and sending a feedback signal to the i-th light fixture through the first signal line; the first light fixture to the i-th light fixture each sending a counting signal or a UID code or a successfully set DMX address to the controller through the first signal line if the i-th light fixture does not receive the feedback signal within a set time.

10 Claims, 3 Drawing Sheets

(56) References Cited

FOREIGN PATENT DOCUMENTS

| | | | |
|---|---|---|---|
| CN | 108429664 A | 8/2018 | |
| CN | 207884933 U | 9/2018 | |
| CN | 109041352 A * | 12/2018 | ............. H05B 45/00 |
| CN | 110072322 A | 7/2019 | |
| JP | 5789727 B1 | 10/2015 | |

OTHER PUBLICATIONS

Search Report including Written Opinion for Chinese Application No. 201910355562.0 dated Apr. 3, 2020; 5 pages.

* cited by examiner

METHOD OF QUICKLY SETTING DMX ADDRESS OF LIGHT FIXTURE

CROSS REFERENCE TO RELATED APPLICATIONS

The present application is a continuation of International Application No. PCT/CN2020/072096, filed on Jan. 14, 2020, which claims priority from Chinese Patent Application No. 201910355562.0, filed on Apr. 29, 2019, all of which are hereby incorporated herein by reference.

TECHNICAL FIELD

The present invention relates to the technical field of lighting, and more specifically to a method of quickly setting a DMX address of a light fixture.

BACKGROUND

When it is needed to modify DMX addresses for a large number of lamps, the existing address setting method of the light fixture needs to perform one by one setting on a control panel of the light fixture or through a RDM function, which is time-consuming, laborious and inefficient.

CN 107529263 A discloses a light fixture address configuration method based on a light fixture control system and an apparatus thereof, in which a controller is used to automatically set a number for each light fixture in a system, and a start address is set for the light fixture through a range number customized by a user. This light fixture address setting method has the following disadvantages:

1. a single data line is used to allocate DMX addresses through unidirectional transmission, so that the efficiency and reliability of data transmission is low;
2. every time the light fixture is energized, a DMX address is allocated to the light fixture in a circuit, which is impossible to maintain the same DMX address for the light fixture in the circuit as required by the user;
3. the DMX addresses must be allocated backward from the first light fixture, which lacks flexibility;
4. a controllable switch needs to be installed inside the light fixture, which increases manufacturing costs and maintenance costs;
5. once abnormal communication occurs at a certain node (e.g., a signal line is blocked, a light fixture is damaged), normal light fixtures behind the node cannot be allocated addresses.

SUMMARY

The present invention provides a method of quickly setting a DMX address of a light fixture, which can allocate DMX addresses backward starting from any light fixture and can determine setting of a DMX address of a light fixture.

The method of quickly setting a DMX address of a light fixture according to the present invention is used to set DMX addresses of N sets of light fixtures, in which the N sets of light fixtures are sequentially connected in series through a first signal line, N=2, 3, ..., a first light fixture is connected with a controller through the first signal line, and let i=1, 2, ..., N−1. The method includes the following steps:

an allocation step:
the controller sending a DMX address to an i-th light fixture through the first signal line;
a setting step:
the i-th light fixture setting DMX address thereof as the received DMX address, calculating a DMX address of an (i+1)th light fixture based on the received DMX address, and sending the DMX address of the (i+1)th light fixture to the (i+1)th light fixture through the first signal line;
the (i+1)th light fixture setting DMX address thereof as the received DMX address, and sending a feedback signal to the i-th light fixture through the first signal line; and
a determining step:
the first light fixture to the i-th light fixture each sending a counting signal and/or a UID code thereof and/or a successfully set DMX address thereof to the controller through the first signal line if the i-th light fixture does not receive the feedback signal sent from the (i+1)th light fixture within a set time after sending the DMX address.

The controller can send a DMX start address to any light fixture through the first signal line so as to realize that DMX addresses are allocated backward from any light fixture. When the number of light fixtures or a UID code of a light fixture is known, it can be determined whether the DMX addresses of all light fixtures are successfully set according to the counting signal, the UID code and the DMX address received by the controller, and the UID code and/or the DMX address of the light fixture that has successfully set the DMX address can be learned.

Further, the controller and the N sets of light fixtures are also sequentially connected in series or in parallel through a second signal line; a method of determining setting of a DMX address of a light fixture according to the UID code and/or the DMX address received by the controller through the first signal line includes the following steps:

the N sets of light fixtures individually sending a counting signal and/or a UID code thereof to the controller through the second signal line;
obtaining the number N' of light fixtures according to the counting signal and/or the UID code received by the controller through the second signal line;
obtaining the number N" of light fixtures that have successfully set DMX addresses according to the counting signal and/or the UID code and/or the DMX address received by the controller through the first signal line;
comparing N' and N" and determining the setting of the DMX address of the light fixture according to the comparison result.

When the number of light fixtures or the UID code of the light fixture is unknown, the number of light fixtures or the UID code of the light fixture can be obtained through the second signal line. However, the second signal line may also have an abnormal communication. Therefore, it is needed to compare N' and N" so as to comprehensively determine the setting of the DMX address of the light fixture, and determine whether the first signal line and the second signal line have an abnormal communication.

Further, a method of determining the setting of the DMX address of the light fixture according to the comparison result specifically includes the following:

if N'=N", determining that the DMX addresses of the N sets of light fixtures are all successfully set;
if N'>N", determining that there is a certain light fixture that is not communicable with the controller through the second signal line exists;
if N'<N", determining that not all the DMX addresses of the N sets of light fixtures are successfully set.

Further, the method also includes the following step:
when N'>N", comparing the UID code received by the controller through the second signal line with the UID code received by the controller through the first signal line so as to determine a UID code of a light fixture that is not communicable with the controller through the second signal line; and when N'>N", it indicates that the second signal line has an abnormal communication between several light fixtures and the controller, so that the number N" of light fixtures learned by statistics through the second signal line is smaller than the number N' of light fixtures learned by statistics through the first signal line. At this time, the UID code of the light fixture corresponding to a position where the second signal line has an abnormal communication can be determined by comparing the UID codes received by the controller through two groups of signal lines, so that an operator can eliminate the abnormal communication in time.

Further, the method also includes the following step:

when N'<N", comparing the UID code received by the controller through the second signal line with the UID code received by the controller through the first signal line so as to determine a UID code of a light fixture that has not successfully set a DMX address; and when N'<N", it indicates that the first signal line has an abnormal communication between any two light fixtures, so that the number N' of light fixtures learned by statistics through the first signal line is smaller than the number N" of light fixtures learned by statistics through the second signal line. At this time, the UID code of the light fixture that has not successfully set the DMX address can be determined by comparing the UID codes received by the controller through two groups of signal lines.

Further, the method also includes the following steps:

after determining that the UID code of the light fixture that has not successfully set the DMX address, the controller sending a control command to the light fixture that has not successfully set the DMX address through the second signal line according to the UID code of the light fixture that has not successfully set the DMX address, and denoting the light fixture that has not successfully set the DMX address as a j-th light fixture, j=2, 3, . . . , N;

after receiving the control command, the j-th light fixture sending a query command to a (j+1)th light fixture through the second signal line;

after receiving the query command, the (j+1)th light fixture sending a response command to the j-th light fixture through the second signal line;

determining a relative connection position of the j-th light fixture among all the light fixtures that have not successfully set the DMX address according to whether the j-th light fixture receives the query command and the response command.

Through the above method, a sequence of light fixtures that have not successfully set DMX addresses can be determined so as to learn a specific position where the first signal line has an abnormal communication, so that the operator can eliminate the abnormal communication in time.

Further, the method also includes the following steps:

finding the light fixtures whose relative connection positions are at the forefront among all the light fixtures that have not successfully set the DMX address, and denoting the found light fixture as an x-th light fixture, x=2, 3, . . . , N;

the controller calculating the DMX address of the x-th light fixture according to the DMX address received through the first signal line and sending the DMX address of the x-th light fixture to the x-th light fixture through the second signal line;

letting i=x, x+1, . . . , N−1, and performing the setting step; and the x-th light fixture to the i-th light fixture each sending the UID code thereof and/or the successfully set DMX address to the x-th light fixture, and the x-th light fixture forwarding the received UID code and/or DMX address to the controller through the second signal line if the i-th light fixture does not receive the feedback signal sent from the (i+1)th light fixture within the set time after sending the DMX address.

After finding out the frontmost light fixture among all the light fixtures that have not successfully set the DMX address, the first signal line and the second signal line can be combined to continue setting the DMX address of the light fixture that has not successfully set the DMX address.

Further, the method also includes the following step:

the i-th light fixture sending a feedback signal to the controller through the first signal line after setting the DMX address as a received DMX start address.

The first signal line may also have an abnormal communication between any initially set light fixture and the controller. Therefore, a feedback signal also should be sent to the controller after the initially set light fixture has successfully set the DMX address. If the controller cannot receive the feedback signal sent by the initially set light fixture, it can be learned that an abnormal communication occurs between the light fixture and the controller, so that the operator can eliminate the abnormal communication in time.

Further, the light fixtures are connected with the controller through an RDM signal line, which also includes the following steps:

learning a connection sequence according to a corresponding relationship between the UID code and the DMX address that are received by the controller through the first signal line;

the controller sending DMX addresses individually to the light fixtures through the RDM signal line according to the connection sequence; and the light fixtures setting DMX addresses thereof as the DMX addresses received through the RDM signal line.

When the DMX address of the light fixture needs to be set as a specific value, which leads to that the DMX addresses of N sets of light fixtures are needed to be set discontinuously, the N sets of light fixtures can be connected with the controller respectively through the RDM signal line.

As described above, after performing the above allocation step, setting step and determining step, the connection sequence of the light fixtures can be learned according to the corresponding relationship between the DMX (Digital Multiplex) address and the UID (Unique Identifier) code that are received by the controller through the first signal line; according to the learned connection sequence of the light fixtures, the controller can directly send the DMX address to the light fixture through the RDM (Remote Device Management) signal line, so that the light fixture completes the setting of the DMX address of the light fixture under an address setting command of the RDM.

Further, the RDM signal line is a second signal line.

Compared with the prior art, some beneficial effects of the present invention can be obtained.

(1) The present invention can quickly set DMX addresses for a large number of light fixtures without one-by-one setting by the staff, improve work efficiency, and can realize that DMX addresses are allocated backward from any light fixture, which is applicable to a wider range.

(2) The present invention has high fault tolerance, and thus, even if abnormal communication occurs at a certain node of the first signal line specially used to quickly set the DMX address, the second signal line can also be used to assist in completing the DMX address setting of each remaining light fixture.

(3) The present invention can help the operator to quickly locate a position that has an abnormal communication.

DETAILED DESCRIPTION OF EMBODIMENTS

According to an embodiment, a method of quickly setting a DMX address of a light fixture which is used to set DMX addresses of N sets of light fixtures, in which the N sets of light fixtures are sequentially connected in series through a first signal line, N=2, 3, . . . , i=1, 2, . . . , N−1, a first light fixture is connected with a controller through the first signal line, and let i=1, 2, . . . , N−1, comprises the following steps:

an allocation step:

the controller sending a DMX address to an i-th light fixture through the first signal line;

a setting step:

the i-th light fixture setting DMX address thereof as a received DMX address, calculating a DMX address of an (i+1)th light fixture based on the received DMX address, and sending the DMX address of the (i+1)th light fixture to the (i+1)th light fixture through the first signal line;

the (i+1)th light fixture setting DMX address thereof as a received DMX address, and sending a feedback signal to the i-th light fixture through the first signal line;

a determining step:

the first light fixture to the i-th light fixture each sending a counting signal and/or a UID code thereof and/or a successfully set DMX address thereof to the controller through the first signal line if the i-th light fixture does not receive the feedback signal sent from the (i+1)th light fixture within a set time after sending the DMX address.

For the convenience of description, the first signal line connected between the i-th light fixture and the (i+1)th light fixture is denoted as A (i−1, i). In a specific implementation process, A (i−1, i) does not communicate with A (i, i+1), and data transmission between A (i−1, i) and A (i, i+1) is forwarded through each light fixture.

In the specific implementation process, the i-th light fixture calculates the DMX address of the (i+1)th light fixture according to the received DMX address thereof, and specifically, the i-th light fixture obtains the DMX address of the (i+1)th light fixture by adding the DMX address received by the i-th light fixture to a channel number occupied by the i-th light fixture.

Figure 1:
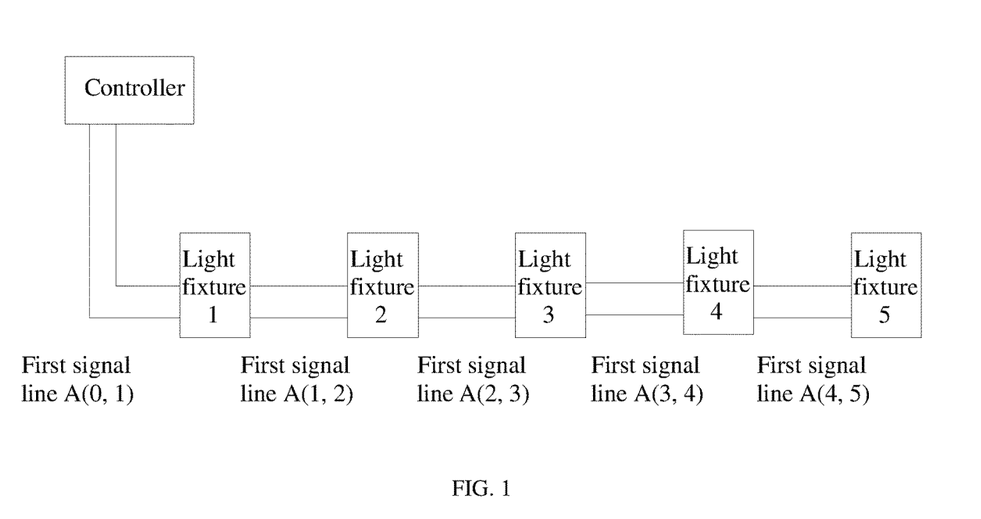
FIG. 1 is a schematic diagram of connection between a controller and light fixtures according to an embodiment of the present invention.

As shown in FIG. 1, taking N=5 as an example, five light fixtures are sequentially connected in series through the first signal line and are numbered 1 to 5. The controller is connected to the first light fixture through the first signal line. It is assumed that all the five light fixtures occupy 4 channels, and all initial DMX addresses are 1. The method provided in this embodiment is used to set the DMX addresses of the five light fixtures and start the DMX address from 10, and the following steps are performed:

(1) the controller sending a DMX address 10 to the first light fixture through A (0, 1);

(2) setting the DMX address of the first light fixture as 10 under an address setting command, adding the DMX address 10 thereof to the number of occupied channels 4 thereof to obtain a new DMX address 14, and sending the DMX address 14 to a second light fixture through A (1, 2);

(3) setting the DMX address of the second light fixture as 14 under an address setting command, and sending a feedback signal to the first light fixture through A (1, 2), which indicates that the DMX address 14 sent by the first light fixture has been received;

(4) the second light fixture adding the DMX address 14 thereof to the number of occupied channels 4 thereof to obtain a new DMX address 18, and sending the DMX address 18 to a third light fixture through A (2, 3);

(5) completing the setting of DMX addresses for the third, fourth, and fifth light fixtures following the above steps, and finally setting the DMX addresses of the first to fifth light fixtures as 10, 14, 18, 22, 26 respectively;

(6) since only five light fixtures are provided without a sixth light fixture, which leads to that the fifth light fixture cannot receive a feedback signal sent by the next light fixture after sending the DMX address 30 within the set time (e.g., 50 milliseconds), the fifth light fixture sending the counting signal and/or the UID code thereof and/or the DMX address thereof to the fourth light fixture through A (4, 5), and the fourth light fixture forwarding a counting signal and/or a UID code and/or a DMX address of the fifth light fixture through A (3, 4) until sent to the controller;

(7) the fourth, third, second and first light fixtures also sequentially sending the counting signal and/or the UID code thereof and/or the DMX address thereof to the controller through the first signal line;

(8) capable of learning the number of light fixtures that have successfully set DMX addresses according to the counting signal and/or the UID code and/or the number of DMX addresses that are received by the controller when the number of light fixtures or a UID code of a light fixture is known, capable of learning which light fixtures have successfully set the DMX address according to the UID code received by the controller, and capable of learning which light fixture has successfully set which DMX address and a sequence of five UID codes corresponding to light fixtures numbered 1 to 5 according to a corresponding relationship between the UID code and the DMX address that are received by the controller, that is, learning a connection sequence of the light fixtures.

Figure 2:
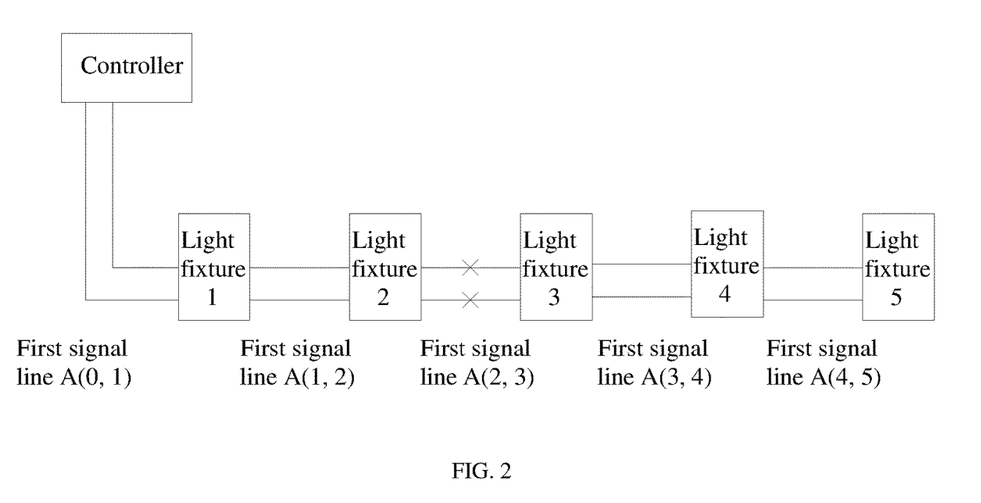
FIG. 2 is a schematic diagram of an abnormal communication occurring on a first signal line according to the embodiment of the present invention.

As shown in FIG. 2, if A (2, 3) has an abnormal communication, the second light fixture cannot receive the feedback signal sent back by the third light fixture within a set time (e.g., 50 milliseconds) after sending the DMX address 14; at this time, the first and second light fixtures may sequentially send the counting signal and/or the UID code thereof and/or the DMX address thereof to the controller, so that it can be learned that only 2 light fixtures—the first and second light fixtures—have successfully set the DMX addresses, and the UID code and the DMX address of the light fixture that has successfully set the DMX address can be learned.

The controller can send a DMX start address to any light fixture through the first signal line so as to realize that DMX addresses are allocated backward from any light fixture. When the number of light fixtures or a UID code of a light fixture is known, it can be determined whether the DMX addresses of all light fixtures are successfully set according to the counting signal and/or the UID code and/or the DMX address received by the controller, and the UID code and/or the DMX address of the light fixture that has successfully set the DMX address can be learned.

In this embodiment, the controller and the N sets of light fixtures are also sequentially connected in series or in parallel through a second signal line; a method of determining setting of a DMX address of a light fixture according to the UID code and/or the DMX address received by the controller through the first signal line includes the following steps:

the N sets of light fixtures individually sending a counting signal and/or a UID code thereof to the controller through the second signal line;

obtaining the number N' of the light fixtures according to the counting signal and/or the UID code received by the controller through the second signal line;

obtaining the number N" of the light fixtures that have successfully set DMX addresses according to the UID code and/or the DMX address received by the controller through the first signal line;

comparing N' and N", and determining the setting of the DMX address of the light fixture according to the comparison result.

Figure 3:
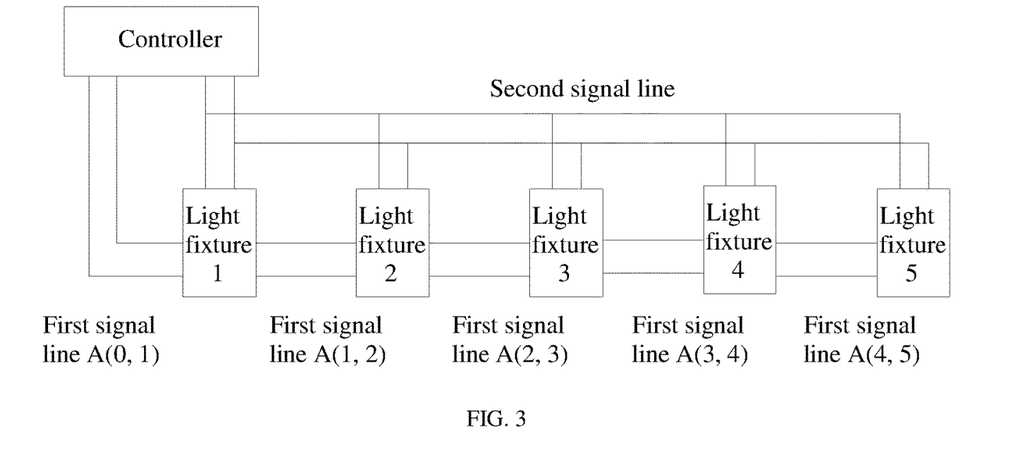
FIG. 3 is another schematic diagram of a connection between the controller and the light fixtures according to the embodiment of the present invention.

As shown in FIG. 3, the light fixtures numbered 1 to 5 are sequentially connected in series through the first signal line, so that the light fixture numbered 1 is connected to the controller through the first signal line while connected with the controller through the second signal line; the controller can send RDM query commands to the five light fixtures through the second signal line, so that the five light fixtures send counting signals and/or the UID codes thereof to the controller through the second signal line so as to learn the number N' of light fixtures; the controller can learn the number N" of light fixtures that have successfully set the DMX addresses through the counting signal and/or the UID code and/or the DMX address received through the first signal line, and determine the setting of the DMX address of the light fixture by comparing N' and N".

When the number of light fixtures or the UID code of the light fixture is unknown, the number of light fixtures or the UID code of the light fixture can be obtained through the second signal line. However, the second signal line may also have an abnormal communication. Therefore, it is needed to compare N' and N" so as to comprehensively determine the setting of the DMX address of the light fixture, and determine whether the first signal line and the second signal line have an abnormal communication.

Specifically, a determining method is as follows:

(1) if N'=N", determining that the DMX addresses of the N sets of light fixtures are all successfully set;

(2) if N'>N", determining that there is a certain light fixture that is not communicable with the controller through the second signal line exists;

(3) if N'<N", determining that not all the DMX addresses of the N sets of light fixtures are successfully set.

Figure 4:
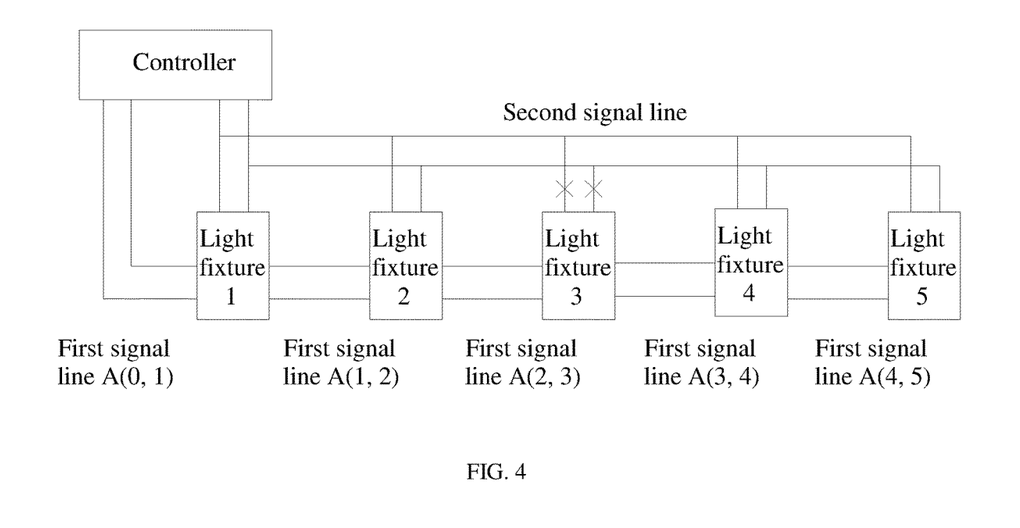
FIG. 4 is a schematic diagram of an abnormal communication occurring on a second signal line according to the embodiment of the present invention.

In the embodiment, the method also includes the following step:

when N'>N", comparing the UID code received by the controller through the second signal line with the UID code received by the controller through the first signal line so as to determine a UID code of a light fixture that is not communicable with the controller through the second signal line; and when N'>N", it indicates that the second signal line has an abnormal communication between several light fixtures and the controller, so that the number N" of light fixtures learned by statistics through the second signal line is smaller than the number N' of light fixtures learned by statistics through the first signal line. As shown in FIG. 4, the second signal line connected between the controller and the third light fixture has an abnormal communication, only the first, second, fourth, fifth light fixtures can send the UID code to the controller through the second signal line, and N" should be 4, while the first signal line has no abnormal communication, and N' should be 5, so that N'>N" at this time; the UID code corresponding to the third light fixture that has abnormal communication with the controller on the second signal line can be determined by comparing the light fixture UID codes obtained by the controller through two groups of signal lines.

Figure 5:
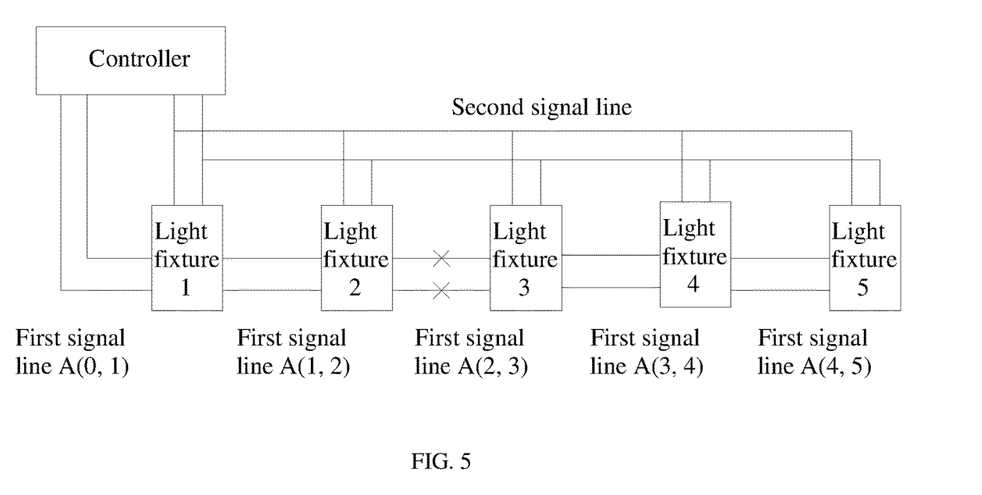
FIG. 5 is another schematic diagram of an abnormal communication occurring on the first signal line according to the embodiment of the present invention.

In the embodiment, the method also includes the following step:

when N'<N", comparing the UID code received by the controller through the second signal line with the UID code received by the controller through the first signal line so as to determine a UID code of a light fixture that has not successfully set a DMX address; and when N'<N", it indicates that the first signal line has an abnormal communication between any two light fixtures, so that the number N' of light fixtures learned by statistics through the first signal line is smaller than the number N" of light fixtures learned by statistics through the second signal line. The first signal line has an abnormal communication between two light fixtures, so that the light fixtures behind a position where abnormal communication occurs cannot successfully set the DMX address. As shown in FIG. 5, A (2, 3) has an abnormal communication, so that the third, fourth, and fifth light fixtures cannot successfully set the DMX address while only the first and second light fixtures send the UID code to the controller, and N' should be 2, while the second signal line has no abnormal communication, and N" should be 5, so that N'<N" at this time; the UID codes of the third, fourth, and fifth light fixtures that have not successfully set the DMX addresses can be determined by comparing the light fixture UID codes obtained by the controller through the two groups of signal lines.

In this embodiment, the method also includes the following steps:

after determining that the UID code of the light fixture that has not successfully set the DMX address, the controller sending a control command to the light fixture that has not successfully set the DMX address through the second signal line according to the UID code of the light fixture that has not successfully set the DMX address, and denoting the light fixture that has not successfully set the DMX address as a j-th light fixture, j=2, 3, . . . , N;

after receiving the control command, the j-th light fixture sending a query command to a (j+1)th light fixture through the second signal line;

after receiving the query command, the (j+1)th light fixture sending a response command to the j-th light fixture through the second signal line; and determining a relative connection position of the j-th light fixture among all the light fixtures that have not successfully set the DMX address according to whether the j-th light fixture receives the query command and the response command.

As to determining a relative connection position of the j-th light fixture among all the light fixtures that have not successfully set the DMX address according to whether the j-th light fixture receives the query command and the response command, specifically the following is included: if the j-th light fixture only receives the response command and does not receive the query command, the relative connection position of the j-th light fixture among all the light fixtures that have not successfully set the DMX address is at the forefront; if the j-th light fixture receives both the response command, and the query command, the relative connection position of the j-th light fixture among all the light fixtures that have not successfully set the DMX address is in the middle; if the j-th light fixture only receives the query command and does not receive the response command, the relative connection position of the j-th light fixture among all the light fixtures that have not successfully set the DMX address is at the end.

In a specific implementation process, report information can include the UID code of the light fixture. Through the report information received by the controller, the UID code corresponding to the light fixture whose relative connection position is at the forefront among all the light fixtures that have not successfully set the DMX address can be learned.

As shown in FIG. 5, A (2, 3) has an abnormal communication, so that the third, fourth, and fifth light fixtures cannot successfully set the DMX address while only the first and second light fixtures send the UID code to the controller. As mentioned above, after determining the UID codes of the third, fourth, and fifth light fixtures that have not successfully set the DMX addresses by comparing the UID codes obtained by the controller through the two groups of signal lines, it cannot be learned which UID code corresponds to which light fixture. At this time, the controller sends control commands to three light fixtures respectively through the second signal line according to the UID codes of the three light fixtures. After receiving the control commands, the three light fixtures send the query command to the next light fixture respectively through the second signal line, while the light fixture that receives the query command sends the response command to the previous light fixture. That is, the third light fixture sends the query command to the fourth light fixture, the fourth light fixture sends the response command to the third light fixture after receiving the query command, the fourth light fixture sends the query command to the fifth light fixture, the fifth light fixture sends the response command to the fourth light fixture after receiving the query command, and the fifth light fixture also sends the query command backward but cannot receive the response command because no sixth light fixture is provided. Therefore, the third light fixture only receives the response command sent by the fourth light fixture, and does not receive the query command sent by the previous light fixture, so that it is determined that the third light fixture is at the forefront among the three light fixtures that have not successfully set the DMX addresses; the fourth light fixture receives both the query command sent by the third light fixture and the response command sent by the fifth light fixture, so that it is determined that the fourth light fixture is in the middle among the three light fixtures that have not successfully set the DMX addresses; the fifth light fixture only receives the query command sent by the fourth light fixture and does not receive the response command sent by the latter light fixture, so that it is determined that the fifth light fixture is at the end among the three light fixtures that have not successfully set the DMX addresses. The third light fixture can send report information to the controller through the second signal line, and reports to the controller that the third light fixture itself is the front light fixture.

Through the above method, a sequence of light fixtures that have not successfully set DMX addresses can be determined so as to learn a specific position where the first signal line has an abnormal communication, so that the operator can eliminate the abnormal communication in time.

In this embodiment, the method also includes the following steps:

finding the light fixtures whose relative connection positions are at the forefront among all the light fixtures that have not successfully set the DMX address, and denoting the found light fixture as an x-th light fixture, x=2, 3, . . . , N;

the controller calculating the DMX address of the x-th light fixture according to the DMX address received through the first signal line and sending the DMX address of the x-th light fixture to the x-th light fixture through the second signal line;

letting i=x, x+1, . . . , N−1, and performing the setting step;

the x-th light fixture to the i-th light fixture each sending the UID code thereof and/or the successfully set DMX address to the x-th light fixture, and the x-th light fixture forwarding the received UID code and/or DMX address to the controller through the second signal line if the i-th light fixture does not receive the feedback signal sent from the (i+1)th light fixture within the set time after sending the DMX address.

As to finding the light fixtures whose relative connection positions are at the forefront among all the light fixtures that have not successfully set the DMX address, specifically the following is included: if the j-th light fixture only receives the response command and does not receive the query command, the j-th light fixture sends the report information to the controller through the second signal line. Through the report information received by the controller, it can be learned that which light fixture has a relative connection position at the forefront among all the light fixtures that have not successfully set the DMX addresses.

After finding out the frontmost light fixture among all the light fixtures that have not successfully set the DMX addresses, the first signal line and the second signal line can be combined to continue setting the DMX address of the light fixture that has not successfully set the DMX address.

As shown in FIG. 5, when it is found that the frontmost light fixture among all the light fixtures that have not successfully set the DMX addresses is the third light fixture, the DMX address 18 of the third light fixture can be obtained by adding the DMX address 14 of the second light fixture to the number of occupied channels 4 of the second light fixture since the controller previously received the DMX addresses of the first and second light fixtures through the first signal line. At this time, the following steps are performed:

(1) the controller sending the DMX address 18 to the third light fixture through the second signal line;

(2) setting the DMX address of the third light fixture as 18 under an address setting command, adding the DMX address 18 thereof to the number of occupied channels 4 thereof to obtain a new DMX address 22, and sending the DMX address 22 to the fourth light fixture through A (3, 4);

(3) setting the DMX address of the fourth light fixture as 22 under an address setting command, and sending a feedback signal to the third light fixture through A (3, 4), which indicates that the DMX address 22 sent by the third light fixture has been received;

(4) completing the setting of DMX address for the fifth light fixture following the above steps, and finally setting the DMX addresses of the third, fourth, and fifth light fixtures that have not successfully set the DMX addresses before as 18, 22, and 26 respectively;

(5) since only five light fixtures are provided without a sixth light fixture, which leads to that the fifth light fixture cannot receive a feedback signal sent by the next light fixture after sending the DMX address 30 within the set time (e.g., 50 milliseconds), the fifth light fixture sending the counting signal and/or the UID code thereof and/or the DMX address thereof to the fourth light fixture through A (4, 5), and the fourth light fixture forwarding a counting signal and/or a UID code and/or a DMX address of the fifth light fixture to the third light fixture through A (3, 4), and similarly, sending the counting signal and/or the UID code and/or the DMX address of the fourth light fixture to the third light fixture;

(6) since A (2, 3) has an abnormal communication, the third light fixture forwarding the counting signals and/or the UID codes and/or the DMX addresses of the third, fourth, and fifth light fixtures to the controller through the second signal line;

(7) learning whether the light fixtures that have not successfully set the DMX addresses before are successfully set at this time according to the counting signal and/or the UID code and/or the DMX address received by the controller.

In this embodiment, the method also includes the following step:

the i-th light fixture sending a feedback signal to the controller through the first signal line after setting the DMX address as a received DMX start address.

The first signal line may also have an abnormal communication between any initially set light fixture and the controller. Therefore, a feedback signal also should be sent to the controller after the initially set light fixture has successfully set the DMX address. If the controller cannot receive the feedback signal sent by the initially set light fixture, it can be learned that an abnormal communication occurs between the light fixture and the controller, so that the operator can eliminate the abnormal communication in time.

When the DMX address of the light fixture needs to be set as a specific value, which leads to that the DMX addresses of N sets of light fixtures are needed to be set discontinuously, the N sets of light fixtures can be connected with the controller respectively through the RDM signal line.

As described above, after performing the above allocation step, setting step and determining step, the connection sequence of the light fixtures can be learned according to the corresponding relationship between the DMX address and the UID code that are received by the controller through the first signal line; according to the learned connection sequence of the light fixtures, the controller can directly send the DMX address to the light fixture through the RDM signal line, so that the light fixture completes the setting of the DMX address of the light fixture under an address setting command of the RDM.

Figure 6:
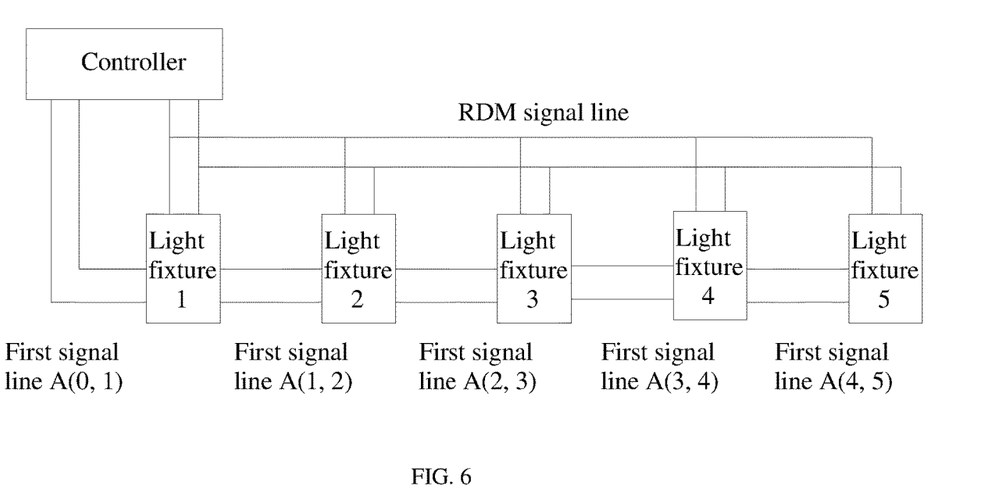
FIG. 6 is another schematic diagram of a connection between the controller and the light fixtures according to the embodiment of the present invention.

As shown in FIG. 6, the light fixtures numbered 1 to 5 are sequentially connected in series through the first signal line, so that the light fixture numbered 1 is connected to the controller through the first signal line while connected with the controller through the RDM signal line. For example, it is needed to set the DMX address of the light fixture numbered 1 as 20, set the DMX address of the light fixture numbered 2 as 1, and set the DMX addresses of the light fixtures numbered 3, 4, and 5 as 30, 34, and 38. After learning the connection sequence of five light fixtures, it can be learned that the light fixture numbered 1 is at the position of the first light fixture, the light fixture numbered 2 is at the position of the second light fixture, the light fixture numbered 3 is at the position of the third light fixture, the light fixture numbered 4 is at the position of the fourth light fixture, and the light fixture numbered 5 is at the position of the fifth light fixture.

As to light fixtures numbered 1 and 2, the controller sets the DMX address of the first light fixture as 20 and sets the DMX address of the second light fixture as 1 through the RDM signal line.

As to light fixtures numbered 3, 4, and 5, since the DMX addresses of the three light fixtures are continuous, it is possible to allow the controller to set the DMX addresses of the third, fourth, and fifth light fixtures as 30, 34, and 38 through the RDM signal line. It is also possible to allow the controller to set the DMX address of the third light fixture as 30 through the RDM signal line or the second signal line, the third light fixture adds the DMX address 30 to 4 to obtain a new DMX address 34 and sends the DMX address 34 to the fourth light fixture through the first signal line; after receiving the DMX address 34, the fourth light fixture sets DMX address thereof as 34, adds 4 to the DMX address 34 to obtain a new DMX address 38, and sends the DMX address 38 to the fifth light fixture; after receiving the DMX address 38, the fifth light fixture sets DMX address thereof as 38.

In the specific implementation process, the RDM signal line is the second signal line, that is, the RDM signal line and the second signal line can be the same group of signal lines.

In the specific implementation process, the communication between the controller and the light fixtures and the communication between the light fixtures adopt 485 communication, and the first signal line and the second signal line include two 485 communication buses.

The invention claimed is:

1. A method of quickly setting a DMX (Digital Multiplex) address of a light fixture, which is used to set DMX addresses of N sets of light fixtures, the N sets of light fixtures are sequentially connected in series through a first signal line, N=2, 3, . . . , a first light fixture is connected with a controller through the first signal line, and let i=1, 2, . . . , N−1, the method comprising the following steps:

an allocation step:

the controller sending a DMX address to an i-th light fixture through the first signal line;

a setting step:

the i-th light fixture setting a DMX address thereof as a received DMX address of the i-th light fixture, calculating a DMX address of an (i+1)th light fixture based on the received DMX address of the i-th light fixture, and sending the DMX address of the (i+1)th light fixture to the (i+1)th light fixture through the first signal line; and the (i+1)th light fixture setting the DMX address thereof as the received DMX address of the (i+1)th light fixture, and sending a feedback signal to the i-th light fixture through the first signal line; and a determining step:

the first light fixture to the i-th light fixture each sending a counting signal and/or a UID (Unique Identifier) code thereof and/or a successfully set DMX address thereof to the controller through the first signal line if the i-th light fixture does not receive the feedback signal sent from the (i+1)th light fixture within a set time after sending the DMX address.

2. The method of quickly setting the DMX (Digital Multiplex) address of the light fixture according to claim 1, wherein the controller and the N sets of light fixtures are also sequentially connected in series or in parallel through a second signal line, and the determining step of determining setting of the DMX address of the light fixture according to the UID (Unique Identifier) code and/or the DMX address received by the controller through the first signal line includes the steps of:

the N sets of light fixtures individually sending a counting signal and/or a UID code thereof to the controller through the second signal line;

obtaining the number N' of light fixtures according to the counting signal and/or the UID code received by the controller through the second signal line;

obtaining the number N" of light fixtures that have successfully set DMX addresses according to the counting signal and/or the UID (Unique Identifier) code and/or the DMX address received by the controller through the first signal line; and comparing N' and N" and determining the setting of the DMX address of the light fixture according to the comparison result.

3. The method of quickly setting the DMX (Digital Multiplex) address of the light fixture according to claim 2, wherein the determining the setting of the DMX address of the light fixture according to the comparison result specifically includes:

if N'=N", determining that the DMX addresses of the N sets of light fixtures are all successfully set;

if N'>N", determining that there is a light fixture that is not communicable with the controller through the second signal line; and if N'<N", determining that not all the DMX addresses of the N sets of light fixtures are successfully set.

4. The method of quickly setting the DMX (Digital Multiplex) address of the light fixture according to claim 2, further comprising the following step:

when N'>N", comparing the UID (Unique Identifier) code received by the controller through the second signal line with the UID code received by the controller through the first signal line, and determining a UID code of the light fixture that is not communicable with the controller through the second signal line.

5. The method of quickly setting the DMX (Digital Multiplex) address of the light fixture according to claim 2, further comprising the following step:

when N'<N", comparing the UID (Unique Identifier) code received by the controller through the second signal line with the UID code received by the controller through the first signal line, and determining a UID code of the light fixture that has not successfully set a DMX address.

6. The method of quickly setting the DMX (Digital Multiplex) address of the light fixture according to claim 5, further comprising the following steps:

after determining that the UID (Unique Identifier) code of the light fixture that has not successfully set the DMX address, the controller sending a control command to the light fixture that has not successfully set the DMX address through the second signal line according to the UID code of the light fixture that has not successfully set the DMX address, and denoting the light fixture that has not successfully set the DMX address as a j-th light fixture, j=2, 3, . . . , N;

after receiving the control command, the j-th light fixture sending a query command to a (j+1)th light fixture through the second signal line;

after receiving the query command, the (j+1)th light fixture sending a response command to the j-th light fixture through the second signal line; and determining a relative connection position of the j-th light fixture among all the light fixtures that have not successfully set the DMX address according to whether the j-th light fixture receives the query command and the response command.

7. The method of quickly setting the DMX (Digital Multiplex) address of the light fixture according to claim 6, further comprising the following steps:

finding the light fixtures whose relative connection positions are at the forefront among all the light fixtures that have not successfully set the DMX address, and denoting the found light fixture as an x-th light fixture, x=2, 3, . . . , N;

the controller calculating the DMX address of the x-th light fixture according to the DMX address received through the first signal line and sending the DMX address of the x-th light fixture to the x-th light fixture through the second signal line;

letting i=x, x+1, . . . , N−1, and performing the setting step; and the x-th light fixture to the i-th light fixture each sending the UID code thereof and/or the successfully set DMX address to the x-th light fixture, and the x-th light fixture forwarding the received UID (Unique Identifier) code and/or DMX address to the controller through the second signal line if the i-th light fixture does not receive the feedback signal sent from the (i+1)th light fixture within the set time after sending the DMX address.

8. The method of quickly setting the DMX (Digital Multiplex) address of the light fixture according to claim 1, further comprising the following step:

the i-th light fixture sending a feedback signal to the controller through the first signal line after setting the DMX address as a received DMX start address.

9. The method of quickly setting the DMX (Digital Multiplex) address of the light fixture according to claim 1, wherein the light fixtures are connected with the controller through an RDM signal line, further comprising the following steps:

learning a connection sequence according to a corresponding relationship between the UID code and the DMX address that are received by the controller through the first signal line;

the controller sending DMX addresses individually to the light fixtures through the RDM signal line according to the connection sequence; and the light fixtures setting DMX addresses thereof as the DMX addresses received through the RDM signal line.

10. The method of quickly setting the DMX (Digital Multiplex) address of the light fixture according to claim 9, wherein the RDM (Remote Device Management) signal line is the second signal line.

* * * * *